US010187696B2

(12) United States Patent
Chimayan et al.

(10) Patent No.: US 10,187,696 B2
(45) Date of Patent: *Jan. 22, 2019

(54) SYSTEMS AND METHODS FOR OVERRIDING CROWD-SOURCED AUTO-SKIP COMMANDS BASED ON USER ACTIVITY

(71) Applicant: Rovi Guides, Inc., San Jose, CA (US)

(72) Inventors: Arevik Chimayan, Valley Village, CA (US); China Arai, Valley Glen, CA (US); Marine Chimayan, Valley Village, CA (US); Kim T. Nguyen, San Gabriel, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,688

(22) Filed: Apr. 9, 2018

(65) Prior Publication Data
US 2018/0234735 A1    Aug. 16, 2018

Related U.S. Application Data

(63) Continuation of application No. 15/188,338, filed on Jun. 21, 2016, now Pat. No. 9,942,610.

(51) Int. Cl.
| | |
|---|---|
| *H04N 5/445* | (2011.01) |
| *H04N 21/472* | (2011.01) |
| *H04N 21/45* | (2011.01) |
| *H04N 21/845* | (2011.01) |
| *H04N 21/4545* | (2011.01) |
| *H04N 21/482* | (2011.01) |

(52) U.S. Cl.
CPC ... *H04N 21/47217* (2013.01); *H04N 21/4532* (2013.01); *H04N 21/45457* (2013.01); *H04N 21/4821* (2013.01); *H04N 21/8456* (2013.01)

(58) Field of Classification Search
CPC .................................................. H04N 21/4532
See application file for complete search history.

(56) References Cited

U.S. PATENT DOCUMENTS

| | | | |
|---|---|---|---|
| 6,385,388 B1 | 5/2002 | Lewis et al. | |
| 7,540,009 B1 | 5/2009 | Bryant et al. | |
| 9,942,610 B2* | 4/2018 | Chimayan | ........ H04N 21/47217 |
| 2005/0132401 A1 | 6/2005 | Boccon-Gibod et al. | |
| 2005/0232610 A1 | 10/2005 | Boger et al. | |
| 2014/0020017 A1* | 1/2014 | Stern | ................ H04N 21/23611 |
| | | | 725/34 |

(Continued)

*Primary Examiner* — Gigi L Dubasky
(74) *Attorney, Agent, or Firm* — Haley Guiliano LLP

(57) ABSTRACT

Systems and methods are provided herein for automatically overriding an auto-skip command embedded in a media asset annotation when a user profile indicates a preference for content that is to be auto-skipped. To this end, a media guidance application may play back a media asset to a user, and detect therein a skip annotation that corresponds to a portion of the media asset that is to be played back. The media guidance application may, in response to detecting the skip annotation, access metadata indicating content of the portion, compare the metadata to entries of a profile of the user, and determine whether the user prefers the content based on the comparing. if the user prefers the content, the media guidance application may refrain from executing a skip command indicated by the skip annotation.

20 Claims, 5 Drawing Sheets

(56) References Cited

U.S. PATENT DOCUMENTS

| | | |
|---|---|---|
| 2014/0255004 A1 | 9/2014 | Allen et al. |
| 2014/0258861 A1* | 9/2014 | Baldwin ............... H04N 21/812 715/716 |
| 2016/0066038 A1* | 3/2016 | Chesluk ............. H04N 21/4667 725/13 |
| 2016/0261915 A1 | 9/2016 | Niebres et al. |

* cited by examiner

SYSTEMS AND METHODS FOR OVERRIDING CROWD-SOURCED AUTO-SKIP COMMANDS BASED ON USER ACTIVITY

CROSS-REFERENCE TO RELATED APPLICATION

This application is a continuation of U.S. patent application Ser. No. 15/188,338, filed Jun. 21, 2016, currently allowed, the disclosure of which is hereby incorporated by reference herein in its entirety.

BACKGROUND

As social media consumption and feedback becomes more prevalent between users, aggregate feedback from many users has been used to determine popular choices. For example, in related art, users are enabled to annotate media to automatically skip scenes (e.g., to fast forward through a spoiler to ensure that a user does not accidentally see scenes that might spoil a user that a user is simply browsing through). Guiding an experience by way of popular aggregate choices is known as "crowdsoucing." Some users, however, would prefer to make decisions that are counter to popular decisions, and may not wish to be guided by crowdsourced data.

SUMMARY

Systems and methods are provided herein for overriding crowdsourced logic based on user preferences. For example, if crowdsourcing indicates that a particular scene of a movie is boring and should be skipped, but that a user would like that scene (e.g., because the user likes a character or actor in that scene), the systems and methods provided herein would ensure that the scene is not skipped and that the user's viewing experience is uninterrupted.

To this end, in some aspects of the disclosure, control circuitry of a user equipment may execute a media guidance application that may automatically override an auto-skip command embedded in a media asset annotation when a user profile indicates a preference for content that is to be auto-skipped. The media guidance application may play back a media asset to a user (or cause a media asset to be played back to a user), and may detect, during playback of the media asset, a skip annotation that corresponds to a portion of the media asset that is to be played back at a present time. For example, crowdsourced data may be transmitted with the media asset that indicates that users generally skip a scene that has just been, or is about to, be reached.

In some embodiments, the media guidance application, in response to detecting the skip annotation, may access metadata indicating content of the portion. For example, the metadata may indicate given objects, entities (e.g., actors or characters), and the like that are present in a scene of the media asset. The media guidance application may then compare the metadata to entries of a profile of the user (e.g., to determine whether the profile indicates that a user likes an actor or character of a scene that is being played back).

In some embodiments, the media guidance application may determine whether the user prefers the content based on the comparing. For example, if an episode of Seinfeld, which is a sitcom starring a character named Kramer, is playing back, and the user prefers seeing all scenes where Kramer is present, the media guidance application may determine that the user prefers the content of the scene that crowdsourcing indicates is to be skipped.

In some embodiments, in response to determining that the user prefers the content, the media guidance application may refrain from executing a skip command indicated by the skip annotation. For example, the media guidance application may refrain from skipping a scene that is indicated as boring by crowdsourcing because the scene includes Kramer, and because the user likes all scenes with Kramer.

In some embodiments, when the media guidance application is playing back the media asset, the media guidance application may receive the media asset with auxiliary data. For example, the media asset may be received with data that indicates information about a given portion of the media asset, such as actors who are present in a scene, historical facts about where the scene was filmed, objects within the scene that are available for purchase, and any other auxiliary data. The media guidance application may, when detecting the skip annotation, detect the skip annotation within the auxiliary data. For example, the auxiliary information may indicate that the given portion of the media asset is to be skipped.

In some embodiments, the media guidance application, when detecting the skip annotation, may access a database comprising skip annotations corresponding to a plurality of playback positions of the media asset. For example, the media guidance application may access a database that compiles crowdsourced data that relates to media assets, including which media a crowd tends to skip (e.g., boring portions, spoilers, and the like). The media guidance application may determine that a playback position of the plurality of playback positions is being played back to the user during the playing back of the media asset (e.g., that a position that a crowd agrees is to be skipped is being played back), and may, in response to determining that the playback position is being played back, detect the skip annotation.

In some embodiments, the media guidance application may receive feedback from a plurality of users that indicates that a given playback position of the media asset should be skipped (e.g., crowdsourced data). The media guidance application may determine whether a threshold amount of feedback has been received. For example, the media guidance application may require that enough people have indicated that a scene is boring, or that the scene contains a spoiler, for it to have a high enough confidence level that a scene in fact is objectively boring or a spoiler, and thus may require a threshold. The media guidance application, in response to determining that the threshold amount of feedback has been received, may then add the given playback position to the plurality of playback positions.

In some embodiments, when determining whether the user prefers the content based on the comparing, the media guidance application may determine whether the metadata indicates that an entity that is reflected in an entry of the profile of the user is present in the media asset at the present time. For example, as described in the foregoing, the media guidance application may determine whether an actor or character that the user prefers is within the scene. The media guidance application may refrain from skipping a portion of a media asset, notwithstanding that crowdsourcing indicates that the portion should be skipped, if such an actor or character is within the scene.

In some embodiments, the media guidance application may, in response to determining that the user prefers the content, execute a skip command indicated by the skip annotation. For example, the media guidance application may skip a scene of a movie based on crowdsourced data.

The media guidance application may then detect that a user has reversed the skip command (e.g., by selecting an "unskip" option or by rewinding), and may update the profile to reflect that the user has reversed the skip command.

In some embodiments, after the user has reversed the skip command, the media guidance application may play back the media asset at a time subsequent to the present time, detect that the content is again being played back, and, based on the updating of the profile, may refrain from skipping the content despite the skip annotation.

In some embodiments, the media guidance application, in response to detecting that the user has reversed the skip command, may update the metadata. In some embodiments, when updating the metadata, the media guidance application may determine whether a threshold number of people have reversed the skip command. For example, the media guidance application may determine whether enough people no longer wish to skip a given scene. The media guidance application may, in response to determining that the threshold number of people have reversed the skip command, delete the skip annotation, thus avoiding an automatic skip command from occurring in the future.

In some embodiments, the media guidance application, in response to determining that the user prefers the content, may execute the skip command (e.g., because crowdsourcing indicates that a scene is to be skipped). The media guidance application may detect that the user has partially reversed the executed skip command by rewinding to an intermediate point within the portion (e.g., by seeking backward through some, but not all, content that was skipped. The media guidance application may then update the profile to reflect a preference for content between the intermediate point and the end of the portion. For example, the media guidance application may learn of actors who are present between the intermediate point and the end of the portion and update the profile to reflect a preference for those actors.

DETAILED DESCRIPTION

Figure 1:
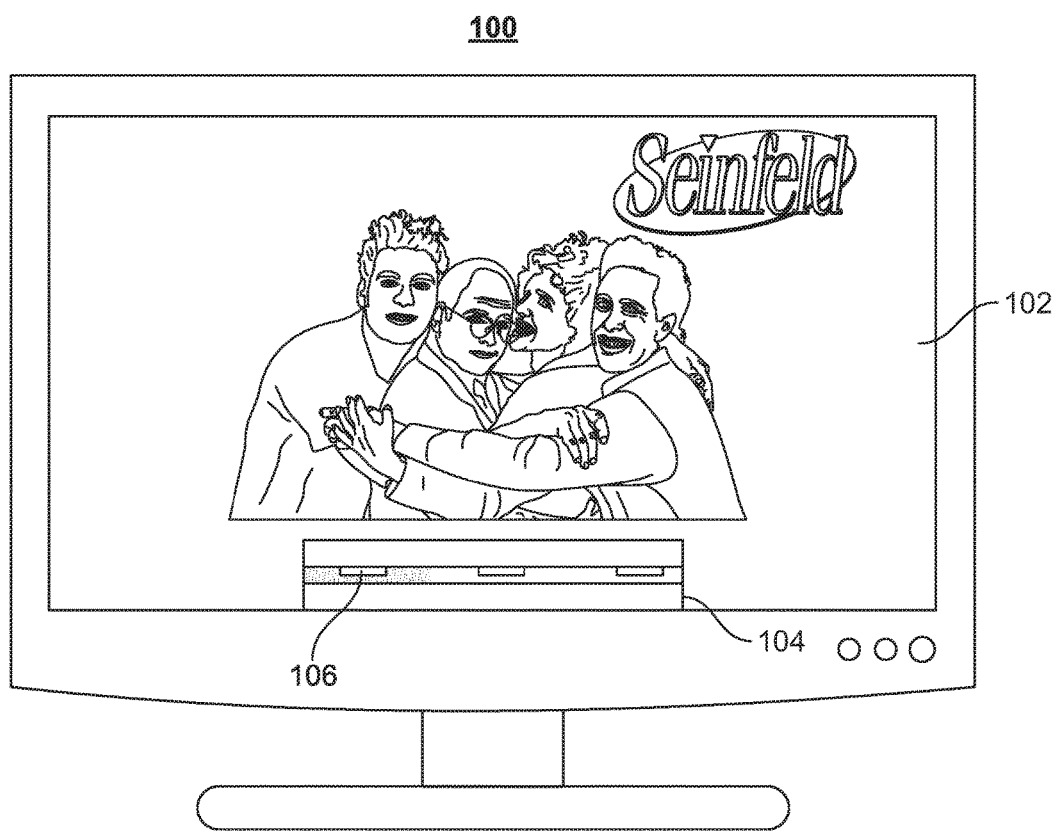
FIG. 1 depicts an illustrative embodiment of a user interface that may include a display of a media asset and a progress indicator, in accordance with some embodiments of the disclosure.

FIG. 1 depicts an illustrative embodiment of a user interface that may include a display of a media asset and a progress indicator, in accordance with some embodiments of the disclosure. FIG. 1 includes user equipment 100. User equipment 100 may include control circuitry, which may execute a media guidance application. The functionality of user equipment, control circuitry, and media guidance applications are described in further detail below at least with reference to FIGS. 2-5.

FIG. 1 also includes media asset 102. In the illustrative example of FIG. 1, media asset 102 is an episode of the television sitcom Seinfeld. Media asset 102, however, may be any media asset as described below with reference to FIGS. 2-5. FIG. 1 also includes progress bar 104 and trick play indicator 106. Progress bar 104 may indicate any progress relevant to media asset 102, such as how much of media asset 102 has been consumed, how much of media asset 102 has been downloaded or buffered, how much of media asset 102 has been paused, and the like.

Trick play indicator 106 may indicate trick play activity, such as activity that alters playback of a media asset, like a fast-forward, rewind, or skip operation. In some embodiments, as will be discussed in further detail below, a media guidance application may be programmed to automatically skip one or more portions of media asset 102. Trick play indicator 106 may indicate portions the one or more portions that are to be skipped. These indications may be visually distinct from other indications of trick play indicator 106 that show user-initiated trick play functions.

In some embodiments, the media guidance application executed by the control circuitry of user equipment 100 may automatically override an auto-skip command embedded in a media asset annotation when a user profile indicates a preference for content that is to be auto-skipped. The term "auto-skip command" (or variations thereof) is a command executed by the media guidance application when an annotation relating to a portion of a media asset indicates that the portion of the media asset is to be skipped. The term "annotation" as used herein refers to anything that may give rise to a command that corresponds to a portion to a media asset. Annotations may be provided by users (e.g., a user may rate a scene of a movie poorly) or by editors (e.g., an editor may add metadata indicating that an actor, product, or other entity relates to a given media asset portion). Annotations and related trick play functionality are discussed in U.S. Patent Application Publication No. 2013/0311575, published on Nov. 21, 2013, and U.S. Patent Application Publication No. 2013/0294755, published on Nov. 7, 2013, each of which are hereby incorporated by reference herein in their entireties.

In some embodiments, the media guidance application may play back media asset 102 to a user, or may cause media asset 102 to be played back to a user. The manner in which media assets, such as media asset 102, may be accessed and played back is described further below with reference to FIGS. 2-5. During playback of media asset 102, the media guidance application may detect a skip annotation that corresponds to a portion of the media asset that is to be played back at a present time. The term "skip annotation" refers to an annotation that, when detected, will trigger a command for the portion of media asset 102 to be skipped over. For example, the skip annotation may indicate a range of times of media asset 102 to be skipped.

Skip annotations, or any annotations, as described above, may be indicated in crowdsourced data. Crowdsourcing annotations are described in U.S. Patent Application Publication No. 2013/0311575, published on Nov. 21, 2013, and U.S. Patent Application Publication No. 2013/0294755, published on Nov. 7, 2013, which were mentioned in the foregoing and incorporated by reference. The crowdsourced data may be retrieved or accessed in any number of ways. For example, crowdsourced data may be transmitted with media asset 102 (e.g., in a vertical blanking interval, or by way of a network packet). In some embodiments, crowdsourced data may be accessed separately from the media asset. For example, memory of user equipment 100 (the memory is described in further detail with reference to FIGS. 2-5) may include a database entry with crowdsourced data. As another example, a third party server or database may store information about crowdsourced data including annotations relating to media asset 102, and the media guidance application of user equipment 100 may access the crowdsourced data in response to the media guidance application beginning playback of media asset 102.

In some embodiments, the media guidance application may cause trick play indicator 106 of progress bar 104 to occur at a time when a portion of media asset 102 is skipped. In some embodiments, the media guidance application may cause trick play indicator 106 of progress bar 104 to populate with portions of media asset 102 that are to be skipped prior to a user progressing to a part of media asset 102 that is to be skipped. Thus, as is indicated in progress bar 104, there may be multiple trick play indicators 106 pre-populated so that a user can see in advance what will be skipped. The media guidance application may detect a user interaction with a progress indicator 106 (e.g., by way of a user input interface, which is described further below with respect to FIGS. 2-5), and may responsively either cancel the skip operation in advance, or may provide the user with further information. The further information may include information about what plot points are in the portion of media asset 102 are to be skipped, what actors or objects are in that portion, and the like. The media guidance application may retrieve the further information from a database, such as a media content source or a media guidance data source, which is described in further detail below with reference to FIGS. 2-5, and may generate for display the information in response to the interaction. As an example, the interaction may be the user tapping trick play indicator 106 with a finger, or hovering a cursor over trick play indicator 106.

In some embodiments, the media guidance application, in response to detecting the skip annotation, may access metadata indicating content of the portion. The metadata may be stored locally in the memory of user equipment 100, or may be stored at a different user equipment accessible to user equipment 100, or may be stored at a remote database such as the below-described media content source or media guidance data source. The metadata may alternatively be transmitted with media asset 102 as described above. In some embodiments, the metadata may indicate given objects, entities (e.g., actors or characters), and the like that are present in a portion of media asset 102. For example, the metadata may be from an entry of a data table that maps attributes of media asset 102 to times or time ranges in which the attributes occur. Thus, the metadata may reflect any object, actor, entity, trivia, and the like that relates to any given portion of media asset 102.

In some embodiments, the media guidance application may then compare the metadata of media asset 102 to entries of a profile of the user. The profile of the user may be stored in any location referenced with respect to the metadata. User profiles are described in further detail with respect to FIGS. 2-5 below. Entries of the profile of the user may indicate preferences of a user, such as actors that a user favors, genres of scenes of media assets that the user favors (e.g., prefers comedy to action), and any other preference that a user may have. The media guidance application may perform the comparison in order to learn whether an attribute of a portion of media asset 102 that is to be skipped due to a skip annotation corresponds to an attribute that the user prefers. For example, if media asset 102 is an episode of Seinfeld, which is a sitcom starring a character named Kramer, and the media guidance application determines, from the user profile, that the user prefers seeing all scenes where Kramer is present, the media guidance application may determine that the user prefers the content of the scene that crowdsourcing indicates is to be skipped. Thus, media guidance application is enabled to determine whether a user's preferences are counter to that of the larger crowd that is supplying the annotations.

In some embodiments, in response to determining that the user prefers the content, the media guidance application may refrain from executing a skip command indicated by the skip annotation. For example, the media guidance application may refrain from skipping a scene that is indicated as boring by crowdsourcing because the scene includes Kramer, and the user prefers Kramer. The media guidance application may perform this refraining in real-time (e.g., by performing the comparison as the skip annotation is reached). Real-time analysis may be advantageous where the metadata is transmitted with the media asset. The media guidance application may also perform this refraining ahead of time (e.g., may determine at the start of playback of media asset 102, or even sooner, which skip annotations should be ignored in favor of user preferences).

In some embodiments, when the media guidance application determines that a skip annotation is to be ignored in favor of user preferences, the media guidance application may delete trick play indicator 106 from progress bar 104. In some embodiments, the media guidance application may determine whether a skip annotation is to be ignored in favor of user preferences if a user interacts (in the manner described above) with a trick play indicator 106.

In some embodiments, when the media guidance application is playing back the media asset, the media guidance application may receive the media asset with auxiliary data. For example, the metadata corresponding to media asset 102 may be received in an auxiliary data stream with other data about media asset 102. The auxiliary data stream may be any data stream received concurrently with media asset 102 (e.g., a vertical blanking interval data stream or a data stream received over an auxiliary channel such as a network channel). The media guidance application may, when detecting the skip annotation, detect the skip annotation within the auxiliary data. For example, the media guidance application may determine (e.g., in real-time) that the auxiliary information indicates that the given portion of the media asset is to be skipped.

In some embodiments, the media guidance application, when detecting the skip annotation, may access a database comprising skip annotations corresponding to a plurality of playback positions of the media asset. For example, a data table may be populated at any place that was described above where metadata may be stored, and the data table may indicate portions of a media asset that a crowd indicates should be skipped. The media guidance application may access this data table to determine whether any given portion of a media asset is to be skipped. The data table may be dynamically updated as the crowd's decisions develop and evolve and more input from a crowd is received.

In some embodiments, when the media guidance application (or a remote server that manages a data table for a crowd's reaction to media asset 102) receives feedback from a plurality of users (the crowd) that indicates that a given playback position of the media asset should be skipped (e.g., crowdsourced data), the media guidance application may determine whether a threshold amount of feedback has been received. For example, the media guidance application may require that enough people have indicated that a scene is boring or a spoiler for it to have a high enough confidence level that a scene in fact is objectively boring or a spoiler. The media guidance application, in response to determining that the threshold amount of feedback has been received, may then add the given playback position to the plurality of playback positions, thus causing a corresponding portion of media asset 102.

In some embodiments, the media guidance application may, in response to determining that the user prefers the content, or in response to determining that the user does not prefer the content, execute a skip command indicated by the skip annotation. For example, the media guidance application may skip a scene of a movie based on the above-described crowdsourced data. The media guidance application may then detect that a user has reversed the skip command (e.g., by selecting an "unskip" option or by rewinding), and may update the profile to reflect that the user has reversed the skip command. For example, the media guidance application may detect the attributes of the unskipped portion of media asset 102 and may update the profile to account for a preference toward those attributes.

In some embodiments, the media guidance application may, prior to updating the profile of the user, in response to detecting a reversal of a skip command, query the user as to why the user reversed the skip command. For example, the query may leverage metadata corresponding to the skipped portion and ask the user which attribute caused the user to unskip the portion. The attributes may be listed, and may be individually selectable. The query may appear on user equipment 100 or a different user equipment (such as a smart phone or tablet, using a push notification).

In some embodiments, after the user has reversed the skip command, the media guidance application may play back media asset 102 at a time subsequent to the present time (e.g., as a re-run, or the media guidance application may re-play media asset 102 when a user requests it be played back again). The media guidance application may detect that the content is again being played back, and, based on the updating of the profile, refrain from skipping the content despite the skip annotation. Thus, the media guidance application may detect in a future portion of media asset 102 that a preferred attribute from the unskipped portion has recurred in a portion that the crowd has again suggested be skipped, and refrain from skipping that portion.

In some embodiments, the media guidance application, in response to detecting that the user has reversed the skip command, may update the metadata. In some embodiments, when updating the metadata, the media guidance application may determine whether a threshold number of people have reversed the skip command. For example, if a threshold number of people who must skip a portion of a media asset is 10,000, and exactly 10,000 had skipped the portion, and then the user unskipped the portion, the number of people who had skipped may be reduced to 9,999 which is below the threshold. This number may be reduced for every user who has reversed the skip command. Alternatively, the media guidance application may separately track the number of people who have reversed the skip command, and override the crowd of people who caused the skip command to occur in the first place if a threshold number of people have reversed the skip command. The media guidance application may, in response to determining that the threshold number of people have reversed the skip command, delete the skip annotation, thus avoiding an automatic skip command from occurring in the future.

In some embodiments, the media guidance application, in response to determining that the user prefers the content, may execute the skip command (e.g., because crowdsourcing indicates that a scene is to be skipped). The media guidance application may detect that the user has partially reversed the executed skip command by rewinding to an intermediate point within the portion (e.g., by seeking backward through some, but not all, content that was skipped). The media guidance application may then update the profile to reflect a preference for content between the intermediate point and the end of the portion (e.g., by leveraging attributes reflected by metadata corresponding to content of media asset 102 between the intermediate point and the end of the portion. For example, the media guidance application may learn of actors who are present between the intermediate point and the end of the portion and update the profile to reflect a preference for those actors.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
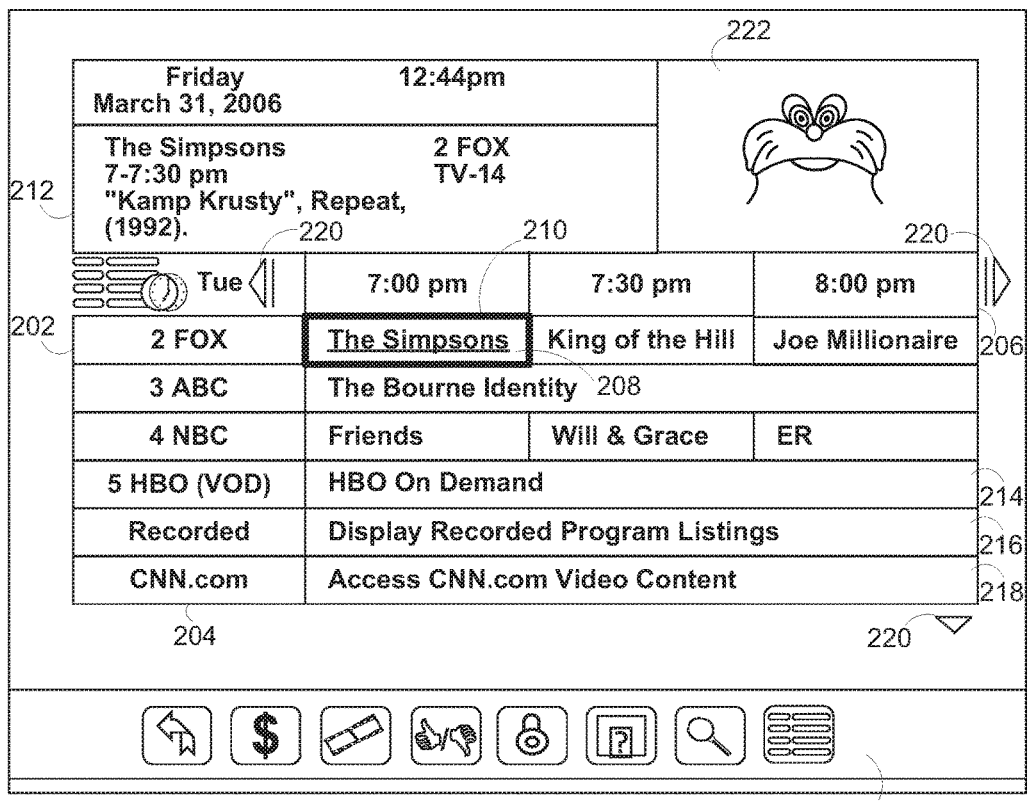
FIG. 2 shows an illustrative embodiment of a display screen that may be used to provide media guidance application listings and other media guidance information, in accordance with some embodiments of the disclosure.
Figure 3:
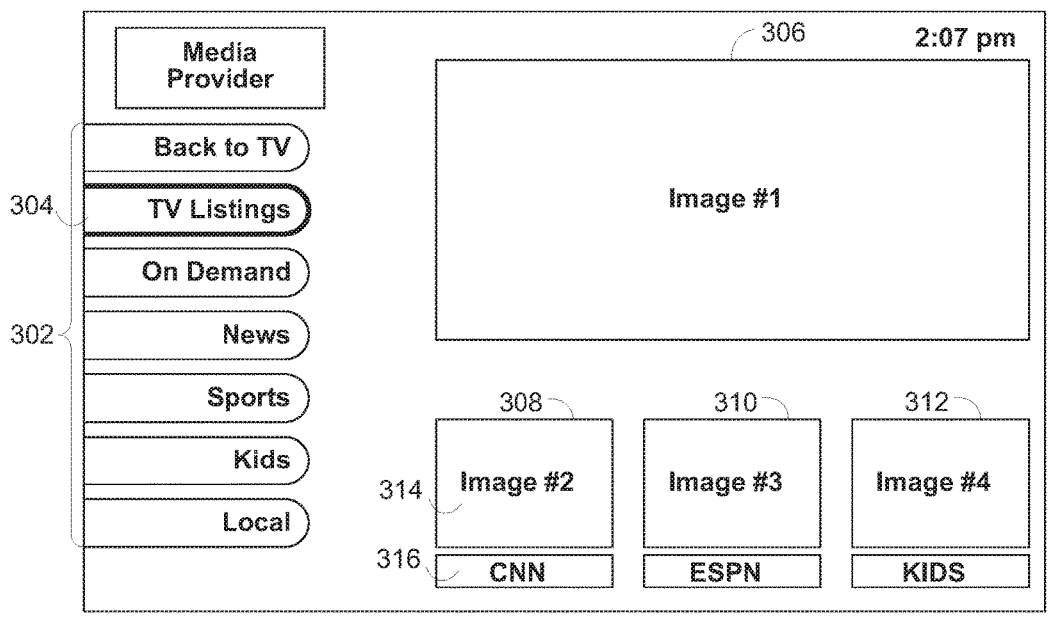
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
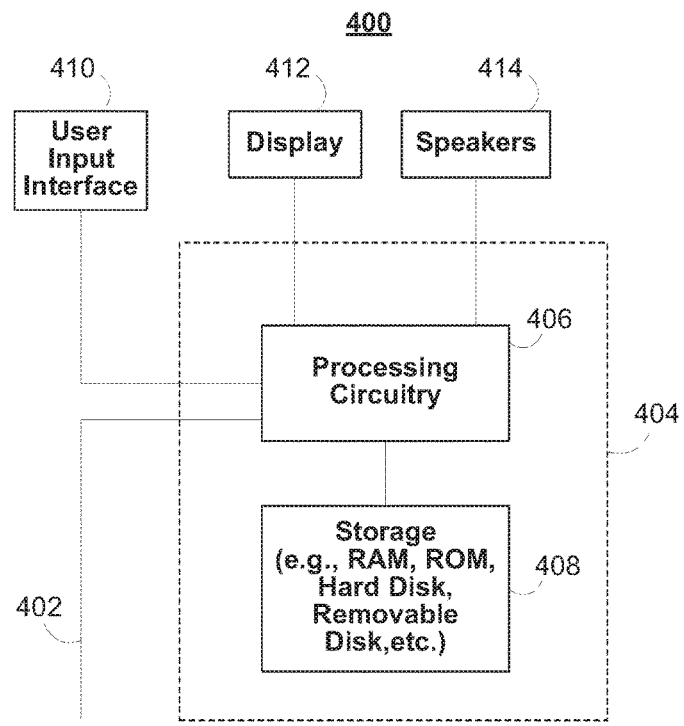
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
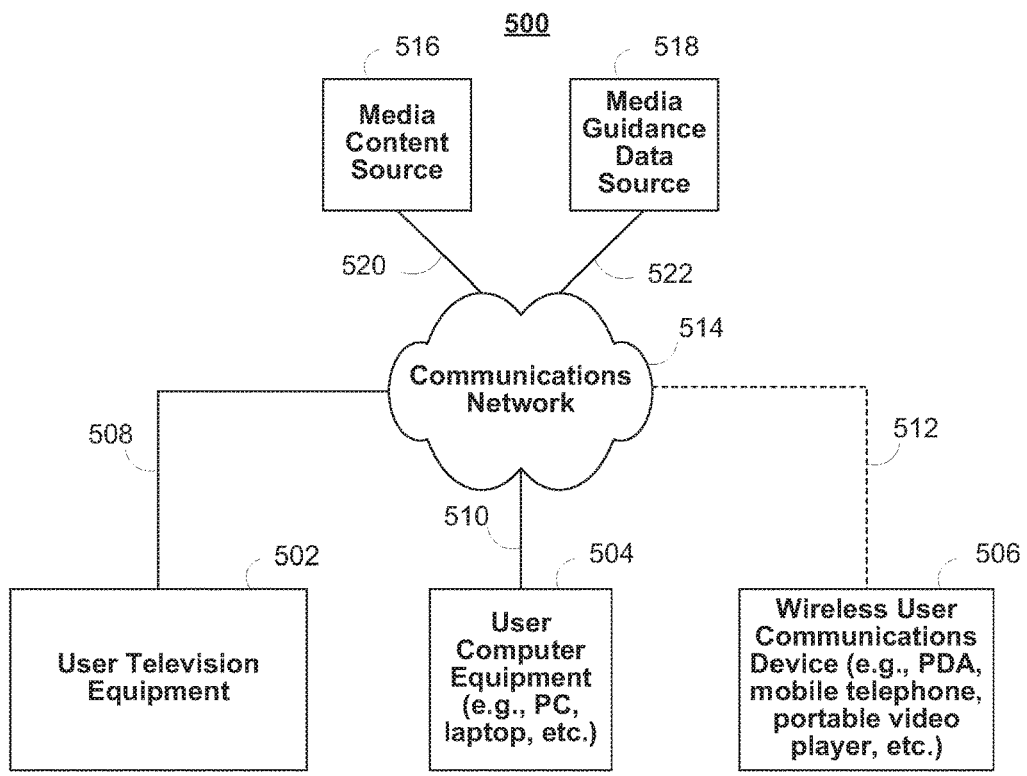
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
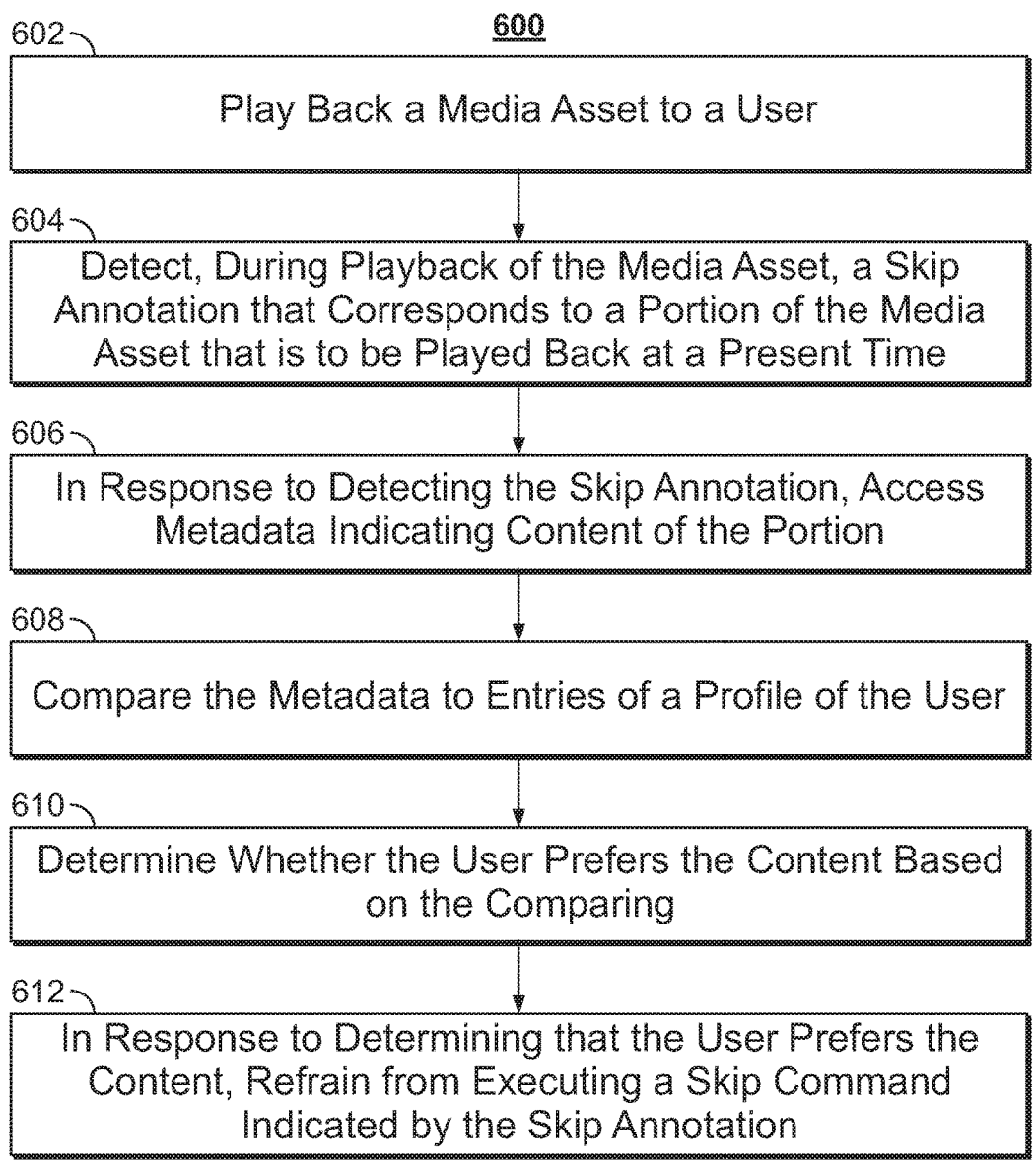
FIG. 6 depicts an illustrative flowchart of a process for overriding a crowdsourced indication to skip a portion of a media asset when a profile indicates that a user viewing the media asset would enjoy the portion, in accordance with some embodiments of the disclosure.

FIG. 6 depicts an illustrative flowchart of a process for overriding a crowdsourced indication to skip a portion of a media asset when a profile indicates that a user viewing the media asset would enjoy the portion, in accordance with some embodiments of the disclosure. Process 600 begins at 602, where a media guidance application (e.g., the media guidance application executed by control circuitry of user equipment 100) may play back a media asset (e.g., media asset 102) to a user.

User equipment 100 may have the same functionalities described with respect to user television equipment 502, user computer equipment 504, and/or wireless user communications device 506 above. The control circuitry of user equipment 100 may have the same functionality of control circuitry 404. The memory of user equipment 100 described above may have the same functionality of storage 408 described above. When user equipment 100 plays back media asset 102, the user equipment may leverage display 412 and speakers 414 to play back the video and audio components, respectively, of media asset 102. Media asset 102 may be accessed by way of media content source 516, which may communicate by way of communications network 514.

Process 600 may continue to 604, where the media guidance application may detect, during playback of media asset 102, a skip annotation that corresponds to a portion of the media asset that is to be played back at a present time. The skip annotation may be received and/or detected in any manner described above. The skip annotation may be received from media content source 516 or from media guidance data source 518, both by way of communications network 514. Alternatively, the skip annotation may be stored at storage 408 of user equipment 100 or any other user equipment.

Process 600 may continue to 606, where the media guidance application may, in response to detecting the skip annotation, access metadata indicating content of the portion. The metadata and mechanisms for accessing the metadata are described in the foregoing. The metadata may be accessed from media content source 516, media guidance data source 518, and/or storage 408 of user equipment 100 or any other user equipment.

Process 600 may continue to 608, where the media guidance application may compare the metadata to entries of a profile of the user. This comparison may be performed in any manner described in the foregoing. The profile may be stored at storage 408 of user equipment 100 (or any other user equipment), or may be stored at media guidance data source 518 or media content source 516, which may be accessed by way of communications network 514.

Process 600 may continue to 610, where the media guidance application may determine whether the user prefers the content based on the comparing. This determination may be performed in any manner described above, and is fleshed out further below with respect to FIG. 7. Process 600 may continue to 612, where, in response to determining that the user prefers the content, the media guidance application may refrain from executing a skip command indicated by the skip annotation. Thus, media asset 102 will continue to play back as normal without a skip operation occurring on the portion of the media asset.

Figure 7:
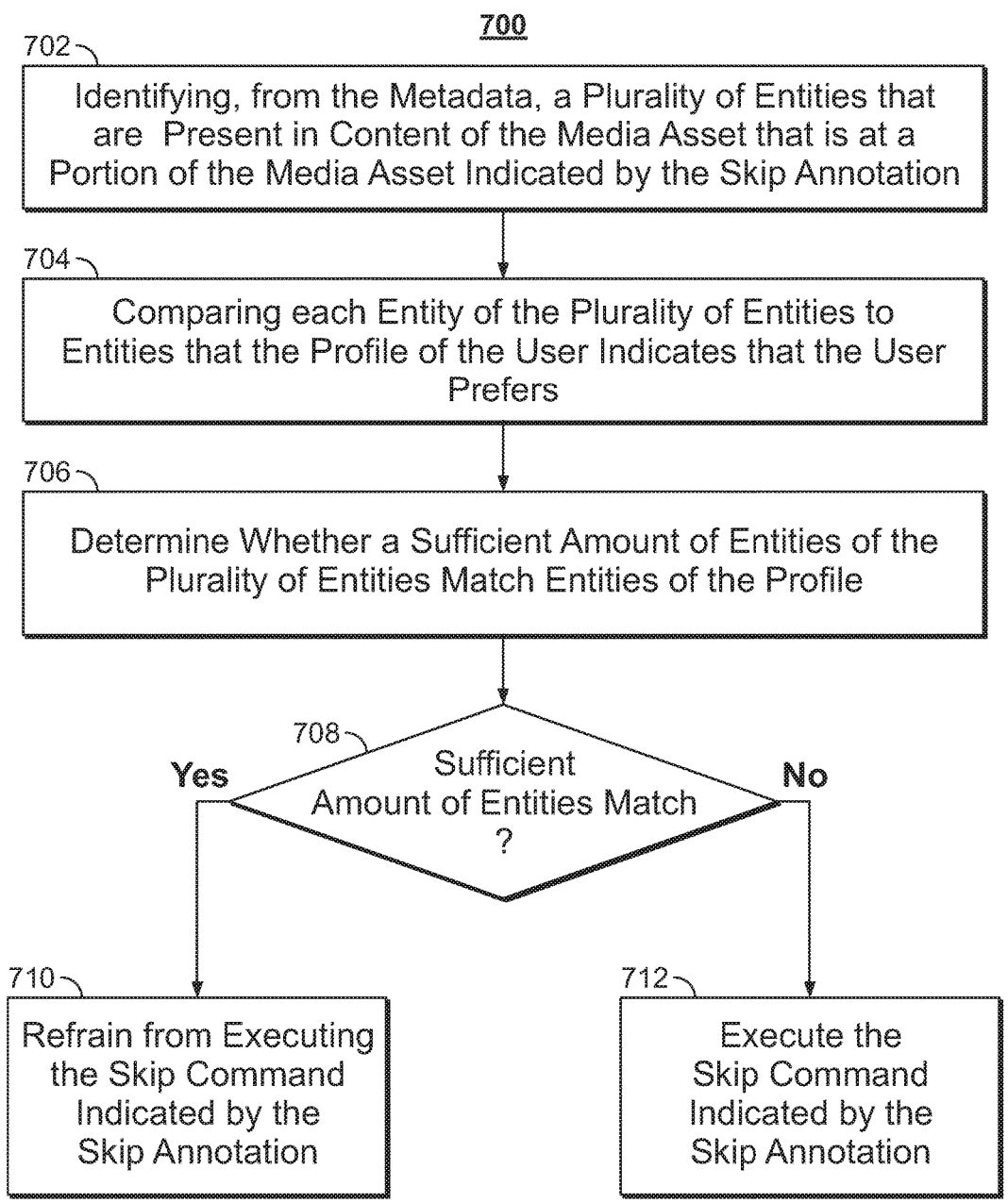
FIG. 7 depicts an illustrative flowchart of a process for determining whether a user would sufficiently enjoy a portion of a media asset that crowdsourcing should be skipped in order to determine whether to override the crowdsourced indication, in accordance with some embodiments of the disclosure.

FIG. 7 depicts an illustrative flowchart of a process for determining whether a user would sufficiently enjoy a portion of a media asset that crowdsourcing should be skipped in order to determine whether to override the crowdsourced indication, in accordance with some embodiments of the disclosure. Process 700 begins at 702, where the media guidance application (e.g., of user equipment 100) may identify, from the metadata, a plurality of entities that are present in content of the media asset that is at a portion of the media asset indicated by the skip annotation. This identification may be performed in any manner described above, such as using a reference table that notes each object that is in a frame of a video, or by using object recognition in the frame to individually determine an identity of each person/object in the frame.

Process 700 may continue to 704, where the media guidance application may compare each entity of the plurality of entities to entities that the profile of the user indicates that the user prefers. For example, as described above, the profile of the user of user equipment 102 may indicate that the user prefers the character Kramer from the television sitcom Seinfeld. If media asset 102 is an episode of Seinfeld, and a skip annotation corresponds to a scene with Kramer in it, the media guidance application would determine based on the comparison that the user prefers an entity in the portion indicated by the skip annotation.

Process 700 may continue to 706, where the media guidance application may determine whether a sufficient amount of entities of the plurality of entities match entities of the profile. For example, the media guidance application may determine whether enough (e.g., a threshold amount) characters, actors, or object that match entities of the profile are within the portion for the portion to be deemed worthwhile to the user. The threshold may be set by the user, set by default settings, or be dynamic and change based on how many entities a user enjoys must be in a scene for the user to enjoy the scene. Each entity may have a certain weight—if a profile reflects that a user prefers one character or object to another, the preferred object may count more toward meeting the threshold than the less preferred object or entity. As an alternative, the media guidance application may determine whether an entity is within the portion for a long enough (e.g., threshold) period of time. Again, the threshold period of time may be set by the user, by default settings, or dynamic based on the user profile. Entities may be weighted, and the weight may affect the threshold period of time. For example, if a user prefers two entities, but prefers one more than the other, the more preferred entity may require a shorter threshold of presence (e.g., 10 seconds) than the less preferred entity (1 minute) for the scene to be deemed worth not skipping despite the skip annotation.

Process 700 may continue to 708, where the media guidance application may determine whether a sufficient amount of entities match (or whether an entity is in the portion to be skipped for a sufficient amount of time). If the answer is in the affirmative, process 700 may continue to 710, where the media guidance application may refrain from executing the skip command indicated by the skip annotation. If the answer is in the negative, the media guidance application may execute the skip command indicated by the skip annotation.

It should be noted that processes 600-700 or any step thereof could be performed on, or provided by, any of the devices shown in FIGS. 1 and 4-5. For example, any of processes 600-700 may be executed by control circuitry 404 (FIG. 4) as instructed by control circuitry implemented on user equipment 502, 504, and/or 506 (FIG. 5) in order to detect a skip annotation. In addition, one or more steps of processes 600-700 may be incorporated into or combined with one or more steps of any other process or embodiment.

It is contemplated that the steps or descriptions of each of FIGS. 6-7 may be used with any other embodiment of this disclosure. In addition, the steps and descriptions described in relation to FIGS. 6-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, identifying entities within content may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings associated with a user, such as profile settings, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention" or "related art," any such reference is merely for the purpose of providing context to the invention(s) of the instant disclosure, and does not form any admission as to what constitutes the state of the art.

What is claimed is:

1. A method for determining whether to execute a skip command embedded in a media asset annotation based on user preference for content that may be skipped, the method comprising:
    playing back a media asset to a user;
    detecting, during playback of the media asset, a first skip annotation that corresponds to a first portion of the media asset;
    in response to detecting the first skip annotation, executing a first skip command indicated by the first skip annotation;
    detecting that the user has reversed the first skip command;
    based on the user having reversed the first skip command, accessing metadata describing attributes of the first portion;
    detecting, during further playback of the media asset, a second skip annotation that corresponds to a second portion of the media asset;
    in response to detecting the second skip annotation, accessing metadata describing attributes of the second portion;
    determining whether the metadata describing the attributes of the second portion matches the metadata describing the attributes of the first portion; and
    based on determining that the metadata describing the attributes of the second portion matches the metadata describing the attributes of the first portion, refraining from executing a second skip command indicated by the second skip annotation.

2. The method of claim 1, further comprising, further based on the user having reversed the first skip command:
    updating metadata of a profile of the user to indicate that the user prefers the attributes of the first portion; and wherein
    determining whether the metadata of the second portion matches the metadata of the first portion comprises determining whether the metadata of the second portion matches the metadata of the profile of the user.

3. The method of claim 1, wherein playing back the media asset comprises receiving the media asset with auxiliary data, and wherein detecting the first skip annotation comprises detecting the first skip annotation within the auxiliary data.

4. The method of claim 3, wherein detecting the second skip annotation comprises detecting the second skip annotation within the auxiliary data.

5. The method of claim 1, wherein detecting the first skip annotation comprises:
    accessing a database comprising skip annotations corresponding to a plurality of playback positions of the media asset;
    determining that a playback position of the plurality of playback positions has been reached during the playing back of the media asset; and
    in response to determining that the playback position has been reached, detecting the first skip annotation.

6. The method of claim 5, further comprising:
    receiving feedback from a plurality of users that indicates that a given playback position of the media asset should be skipped;
    determining whether a threshold amount of feedback has been received; and
    in response to determining that the threshold amount of feedback has been received, adding the given playback position to the plurality of playback positions.

7. The method of claim 6, further comprising, further based on detecting that the user has reversed the first skip command:
    determining whether a threshold number of people have reversed the first skip command; and
    based on determining that the threshold number of people have reversed the first skip command, deleting the first skip annotation.

8. The method of claim 1, wherein determining whether the metadata of the second portion matches the metadata of the first portion comprises determining whether a first attribute of the attributes of the first portion matches a second attribute of the attributes of the second portion.

9. The method of claim 1, wherein detecting that the user has reversed the first skip command comprises detecting that the user has partially reversed the first skip command by rewinding to an intermediate point within the first portion.

10. The method of claim 9, wherein accessing the metadata describing the attributes of the first portion comprises accessing metadata describing attributes of a third portion between the intermediate point and an end of the first portion.

11. A system for determining whether to execute a skip command embedded in a media asset annotation based on user preference for content that may be skipped, the system comprising:
    communications circuitry; and
    control circuitry configured to:
        play back a media asset to a user;
        detect, during playback of the media asset, a first skip annotation that corresponds to a first portion of the media asset;
        in response to detecting the first skip annotation, execute a first skip command indicated by the first skip annotation;
        detect that the user has reversed the first skip command;
        based on the user having reversed the first skip command, access metadata describing attributes of the first portion;
        detect, during further playback of the media asset, a second skip annotation that corresponds to a second portion of the media asset;
        in response to detecting the second skip annotation, access metadata describing attributes of the second portion;
        determine whether the metadata describing the attributes of the second portion matches the metadata describing the attributes of the first portion; and
        based on determining that the metadata describing the attributes of the second portion matches the metadata describing the attributes of the first portion, refrain from executing a second skip command indicated by the second skip annotation.

12. The system of claim 11, wherein the control circuitry is further configured, further based on the user having reversed the first skip command, to:
- update metadata of a profile of the user to indicate that the user prefers the attributes of the first portion; and
- wherein the control circuitry is further configured, when determining whether the metadata of the second portion matches the metadata of the first portion, to determine whether the metadata of the second portion matches the metadata of the profile of the user.

13. The system of claim 11, wherein the control circuitry is further configured, when playing back the media asset, to receive the media asset with auxiliary data, and wherein the control circuitry is further configured, when detecting the first skip annotation, to detect the first skip annotation within the auxiliary data.

14. The system of claim 13, wherein the control circuitry is further configured, when detecting the second skip annotation, to detect the second skip annotation within the auxiliary data.

15. The system of claim 11, wherein the control circuitry is further configured, when detecting the first skip annotation, to:
- access a database comprising skip annotations corresponding to a plurality of playback positions of the media asset;
- determine that a playback position of the plurality of playback positions has been reached during the playing back of the media asset; and
- in response to determining that the playback position has been reached, detect the first skip annotation.

16. The system of claim 15, wherein the control circuitry is further configured to:
- receive feedback from a plurality of users that indicates that a given playback position of the media asset should be skipped;
- determine whether a threshold amount of feedback has been received; and
- in response to determining that the threshold amount of feedback has been received, add the given playback position to the plurality of playback positions.

17. The system of claim 16, wherein the control circuitry is further configured, further based on detecting that the user has reversed the first skip command, to:
- determine whether a threshold number of people have reversed the first skip command; and
- in response to determining that the threshold number of people have reversed the first skip command, delete the first skip annotation.

18. The system of claim 11, wherein the control circuitry is further configured, when determining whether the metadata of the second portion matches the metadata of the first portion, to determine whether a first attribute of the attributes of the first portion matches a second attribute of the attributes of the second portion.

19. The system of claim 11, wherein the control circuitry is further configured, when detecting that the user has reversed the first skip command, to detect that the user has partially reversed the first skip command by rewinding to an intermediate point within the first portion.

20. The system of claim 19, wherein the control circuitry is further configured, when accessing the metadata describing the attributes of the first portion, to access metadata describing attributes of a third portion between the intermediate point and an end of the first portion.

* * * * *